April 26, 1932.  G. E. PORTER  1,855,868

THIRD AXLE ATTACHMENT

Filed April 20, 1929  4 Sheets—Sheet 1

INVENTOR
Gilbert E. Porter
BY
ATTORNEYS

April 26, 1932.  G. E. PORTER  1,855,868
THIRD AXLE ATTACHMENT
Filed April 20, 1929  4 Sheets-Sheet 4

INVENTOR
Gilbert E. Porter
BY
ATTORNEYS

Patented Apr. 26, 1932

1,855,868

UNITED STATES PATENT OFFICE

GILBERT E. PORTER, OF ALMA, MICHIGAN, ASSIGNOR TO TRUCK EQUIPMENT CO. INC., OF BUFFALO, NEW YORK, A CORPORATION OF NEW YORK

THIRD AXLE ATTACHMENT

Application filed April 20, 1929. Serial No. 356,736.

The present invention pertains to a novel auxiliary axle attachment flexibly interconnected with a drive axle unit to convert a four-wheel vehicle, for example, into one of six-wheel type for carrying heavier loads than are permitted on four-wheel vehicles under statutory road-protecting regulations. Its application is not, however, restricted to powered or self-propelled vehicles, being equally serviceable for the same purpose in association with all types of trailing vehicles.

The problem with which therefore my invention is concerned has to do with means for increasing the pay load of self-propelled and other vehicles without running counter to regulatory laws enacted for road protection and preservation through insistence upon reasonably low maximum load pressures per unit of road supporting area.

The primary object of my invention is to provide a yielding unitary structure that will readily accommodate itself to road-surface irregularities without unduly stressing any of its elements or the vehicle parts to which it is attached, a floating "universal" movement being provided throughout to compensate for road humps and depressions.

Still another object of my invention is to provide resiliency as well as freedom of movement of the parts of my third axle unit to secure "easy riding" for the load and "soften" or "cushion" the pounding to which roads are subjected when vehicle wheels drop off the obstructions over which they are forced to pass.

With my auxiliary axle attachment properly-spaced yieldable and aligned relationship is maintained between it and the drive axle of self-propelled and other vehicles, the various parts being so arranged and interconnected that the torsional and other stresses arising from mutual reactions therebetween are reduced to minimum values, thus increasing the useful life of both vehicle and attachment.

The described construction was developed to insure dependability through simplicity and compactness of design, arrangement, facility of application, and flexibility in operation, functioning without imposing any undesirable limitation on other features of design of the vehicle to which the attachment is applied.

With these and other objects in view my invention is fully set forth and more particularly pointed out in the appended claims, reference being had to the accompanying drawings, in which

Figure 1:
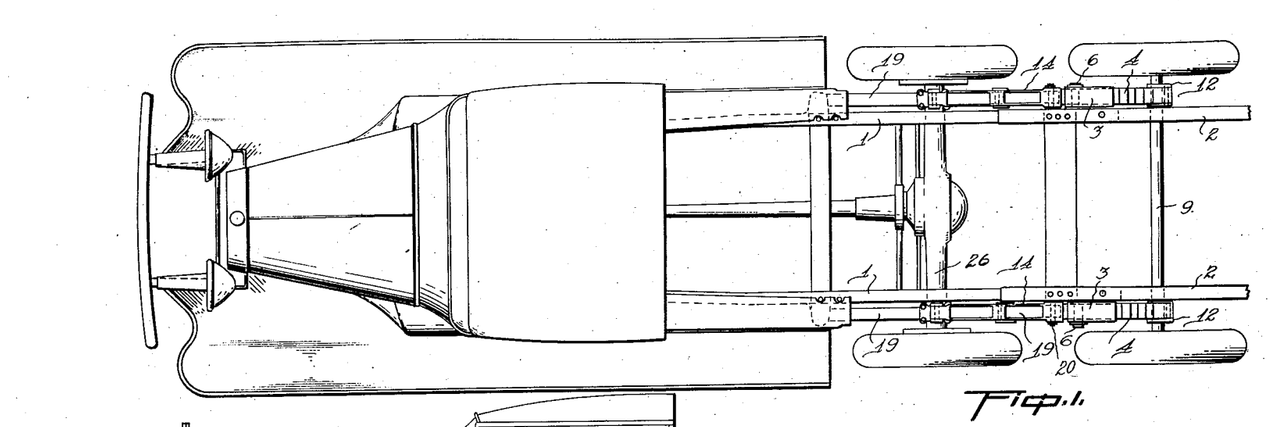
Figure 1 is a plan view of a self-propelled vehicle chassis to which my attachment is applied.
Figure 2:
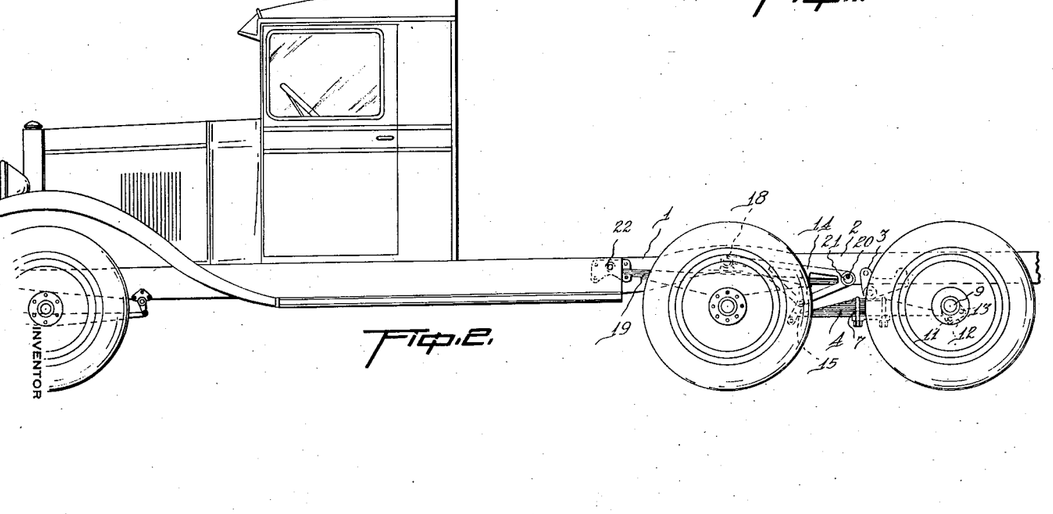
Figure 2 is a side elevation of the chassis.

As indicated by Figures 1 and 2, my auxiliary axle attachment, as applied to the frame 1 of a four-wheel self-propelled vehicle, forms part of a frame extension 2 riveted or otherwise securely fastened to side members of the frame 1. To the frame extension 2 are riveted two brackets 3 that support the auxiliary axle springs 4 in oscillatory relation to the frame 2 and auxiliary axle 9. The upper spring-clip holding plate 5 carries a shaft 6 the ends of which are free to move up and down in elongated slots in the spring-supporting bracket 3, the spring clips 7 and plate 8 serving to hold the spring leaves together.

Figures 3, 4, 5, 6, 7:
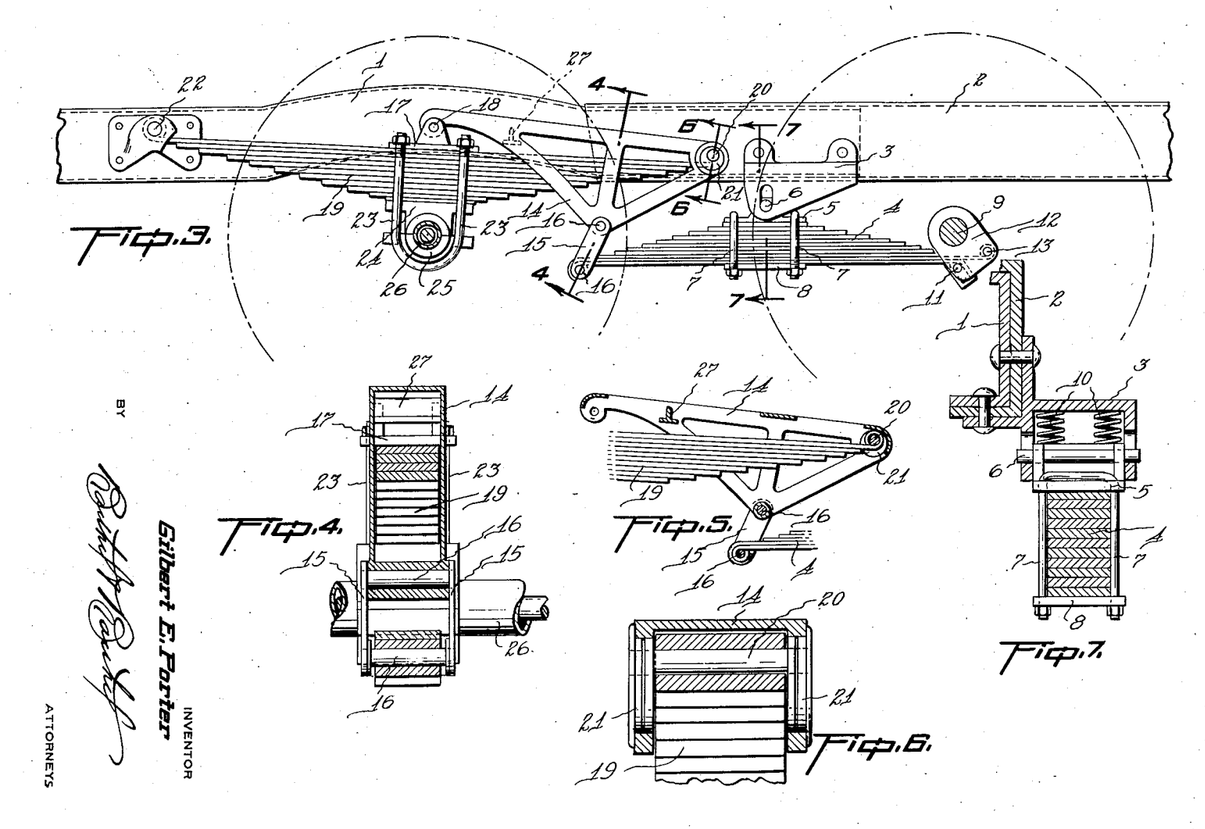
Figure 3 is a fragmentary side elevation with the wheel removed showing the application and constructional details of my invention.
Figure 4 is a vertical cross-sectional view on line 4—4 of Figure 3.
Figure 5 is a longitudinal cross-sectional view of one of the bifurcated floating links by which the driving and auxiliary axle springs are yieldably connected.
Figure 6 is a cross sectional view of the floating link end to which the drive axle spring is flexibly attached.
Figure 7 is a cross sectional view on line 7—7 of Figure 3.

Above the shaft 6, between the upper surface of the plate 5 and under surface of supporting bracket 3, are coiled compression cushioning springs, as shown in Figure 7, possessing shock-absorbing stress-relieving characteristics that help to make the load ride easier and keep it level. On reference to Figures 3, 8, 10, and 11, it will be noticed that the end of one leaf of the spring 4 is shaped to form an opening within which the spring shackle bolt 11 is free to move under torsional stress set up when the vehicle is traveling out of a straight-line direction, as in turning corners.

Figure 11:
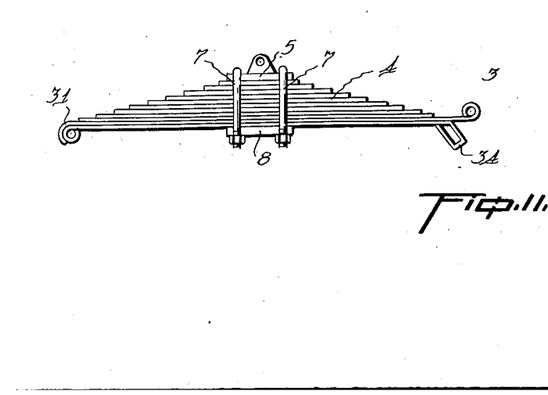
Figure 11 is an elevation of one of the auxiliary axle springs having leaf ends that give to the springs flexible radius-rod spacing characteristics and provide for reduction of torsional stresses thereon.

The leaf lying next above the one that serves to provide stress relief through flexibility of attachment to the shackling spring seat 12 through bolt 11 takes the place of a radius rod, shackle bolts 13 holding the auxiliary springs to seat castings 12 one of which is rigidly attached to the auxiliary axle, the other being free to turn thereon and thereby add its quota to the stress-relieving element of flexibility.

Further cushioning of shocks to both road and load when passing over rough places, as well as distribution of load pressures over larger sub-surface road-supporting areas, is provided through application of bifurcated floating links 14 yieldably attached to one end of the auxiliary springs 4 by the shackles 15 and shackle bolts 16, to the upper spring-clip holding plates 17 by shackle bolts 18, and to one end of the drive-axle springs 19 by shackle bolts 20, eccentrically positioned in rotatable bushings 21 in the walking-beam type of floating link 14, repeated flexure of the springs causing an oscillatory, stress-relieving movement of the bushings which turn freely as the length of the springs changes with change of stress thereon.

Only the forward end of the drive-axle spring 19 may be said to have a fixed point of attachment to the chassis frame, and even at this point the connection is pivotal, the main spring leaf having an oscillating movement about the shackle bolt 22. The drive-axle spring 19 is held by spring clips 23 to a split-bearing seat 24—25 adapted to turn on the drive-axle housing 26, the spring clips 23 serving also to hold in position the clip-holding and shackle-bolt holding plates 17 to which one end of each of the floating links 14 is pivotally attached. Provision for oscillatory movement at points 22, 18, 20, 16, 6, 11, and 13 gives a degree of flexibility in service that compensates for road irregularities, both drive and auxiliary axles and wheels moving freely without greatly disturbing the level of the vehicle body.

The floating links by which the drive-axle springs are yieldably connected to the auxiliary-axle springs serve to transfer to the drive-axle wheels and tires part of the extra load that use of the attachment permits of carrying, thereby increasing traction without unduly increasing wear of the tires, because equalizing interaction between the springs serves to eliminate wide variations in the applied tractive effort by softening or cushioning the inertia shocks transmitted to the road and load when passing over rough uneven surfaces.

Upon reference to Figure 5, which is a sectional view of the floating spring-straddling link 14 as it would appear if cut just back of its near-side downwardly-projecting leg, it will be seen that a stop 27 is provided to give a somewhat different stress distribution when the vehicle is heavily loaded, in which case the stop 27 comes in contact with the drive-axle spring.

As indicated by Figure 5, the two downwardly-projecting legs of the spring-straddling floating link 14 are connected by integral stiffening webs at the center and ends, as well as by the stop 27 and the metal through which the hole for shackle bolt 16 is drilled, thus insuring strength sufficient to withstand quickly applied stresses without breakage, distortion, or cramping.

Adequate compensation for change of drive-axle spring length with change of stress is provided by oscillatory movement of the floating link bushings 21 in which are eccentrically mounted the spring-holding shackle bolts 20, as shown clearly by Figures 2, 3, 5, and 6.

Figure 8:
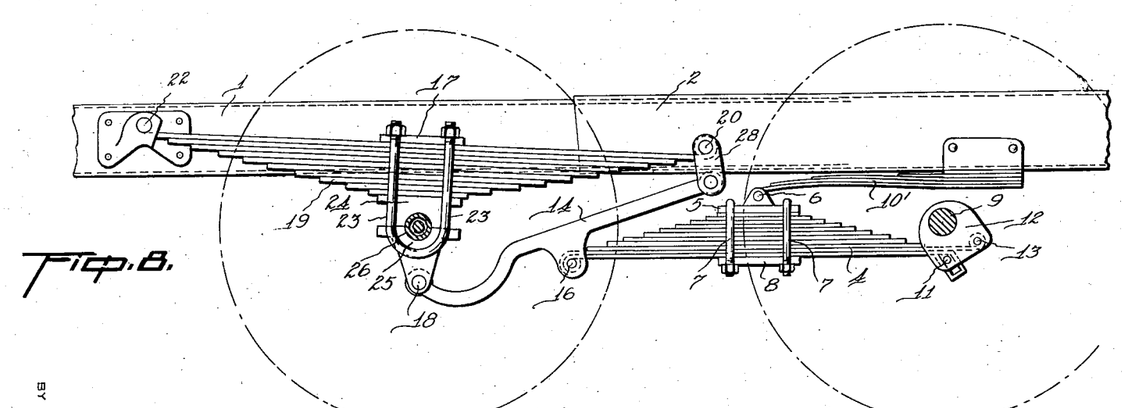
Figure 8 is a fragmentary side elevation showing the floating link in reversed or underslung position.
Figure 9:
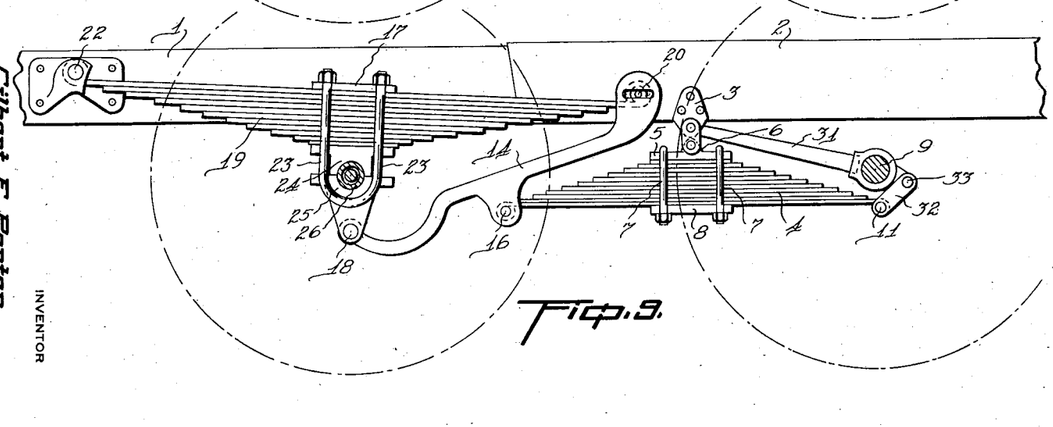
Figure 9 is a fragmentary side elevation showing a modified application of the underslung floating link of Figure 8.
Figure 10:
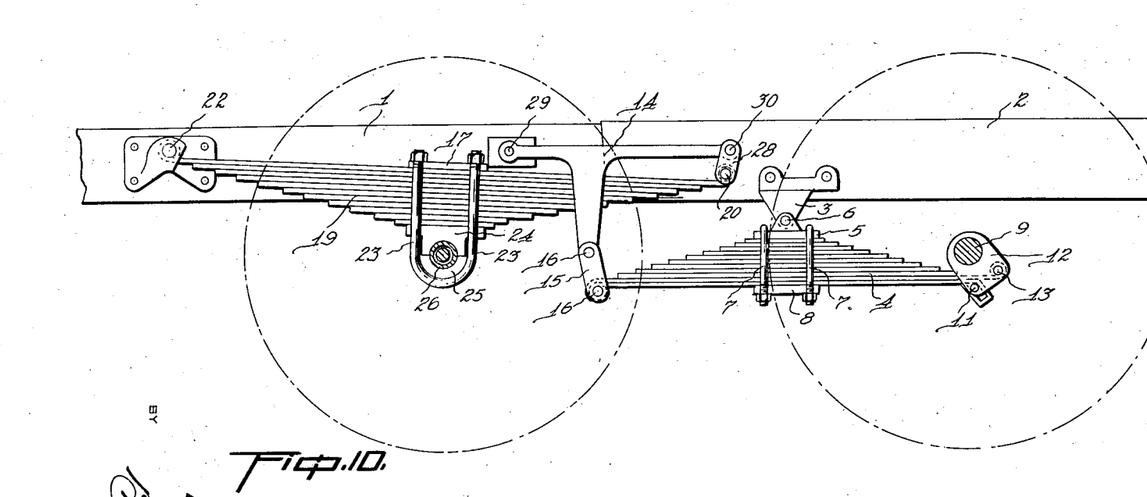
Figure 10 is a fragmentary side elevation showing the application of a modified form of overslung floating link.

When the floating links 14 are of the modified form shown in Figure 10 or are underslung, as shown in Figure 8, compensation for spring length changes under stress is afforded by oscillatory movement of spring shackles 28, or one end of each of the floating links may be provided with a slotted opening, as in Figure 9, in which the shackle bolt may move freely.

When the vehicle to which my attachment is applied is lightly loaded the cushion springs 10 (Figures 3 and 8) that give a shock-absorbing type of yieldable mounting to the auxiliary springs may carry a considerable proportion of the load without transferring much of it to the drive-axle springs through the floating link 14, but when heavily loaded, so that the cushioning springs are fully compressed and shafts 6 rest at the top of the slots in the brackets 3, a definitely predetermined proportion of the excess load is carried by the auxiliary springs 4 and attached axle 9, some of the weight-stress being transferred to the drive axle housing 26 through springs 19 at such points intermediate the ends thereof as to give desired weight distribution and maximum stress absorption or cushioning.

With an underslung arrangement of the floating links, such as that shown, for example, by Figure 8 the connecting relationships are approximately the same as those shown in Figure 3, the pivotal point of attachment of the floating link 14 at shackle bolt 18 being underneath instead of above the drive axle and its springs.

That positioning of the floating link 14 influences weight distribution is made evident by Figure 10, which shows a form of overslung link pivotally attached by bolts 29 to the chassis frame at one end and to the drive-axle spring at the other end through shackle 28 and shackle bolts 30 and 20. This figure also shows a somewhat modified means of attaching the auxiliary spring support bracket 3, the cushioning or light-load springs 10 (Figures 7 and 8) having been omitted.

Another modification involving a slightly different auxiliary-spring hook-up to chassis frame and auxiliary axle is illustrated in Figure 9, which shows how radius rods 31 pivotally attached to frame bracket 3 are connected to the auxiliary axle, to which the auxiliary springs are attached at one end through shackles 32 and shackle bolts 33 and 11.

With the preferred type of auxiliary spring shown in Figure 11, which is a feature of my invention, the use of separate radius rods is obviated, one of the spring leaves 31 being made to serve that purpose, the spring bolt eye at one end of the leaf receiving shackle bolt 13 while the other end of the leaf is formed to hook over the main-leaf bolt eye that receives shackle bolt 16. Besides making the auxiliary springs serve as radius rods to hold the auxilary axle in proper alignment with the drive axle they are also made to serve as a means for preventing injury to tires by "scuffing" when making turns from straight-line travel, the slot form of eye 34 in the main leaf of auxiliary springs permitting of an automatic adjustment of the position of the auxiliary-axle wheels to suit turning conditions, the auxiliary-axle wheels "tracking" those of the drive axle unit without "dragging" on the turns.

Another factor contributing to this result lies in the mounting of the auxiliary spring seat castings 12, one of which is rigidly secured to the axle, while the other is free to oscillate on the auxiliary axle in accommodation to the twisting or swiveling stress thrown upon it by turning of the vehicle. In other words, the cooperative relationship between spring mountings adapted for oscillatory movement and springs ends permitting of a slidingly yieldable association therewith serves to eliminate the detrimental effect of scuffing on tires.

Having shown and described the construction and application of the various elements that are combined in my invention, the operation thereof may briefly be outlined by directing attention to the fact, first, that whether or not the vehicle to which my attachment is applied is loaded to its full capacity, reactionary movement of the auxiliary spring 4 and drive axle springs 19 is accompanied by a "floating" stress-cushioning movement of the ruggedly-proportioned weight-distributing link 14 by which the springs are so flexibly associated as not only to insure freedom of up and down action therebetween but to afford a sufficient degree of swiveling action in harmony with that provided for by the mounting of the auxiliary axle spring supports 12 to compensate fully for twisting stresses set up by passage over road obstructions and turning of vehicle, the ends of the auxiliary axle assuming positions that insures proper "tracking" and rolling of wheel tires on curves, eliminating slippage and consequent "scuffing" of tires.

Second, proportioning of weight distribution may readily be varied by dimensional changes in parts and location of points of attachment, but no rebuilding of springs or other changes in original vehicle design or equipment are necessary in applying and getting effective service from my attachment. The disclosed hook up is the result of intensive experimental research and is of demonstrated practical value, having been tested out under actual service or working conditions and found to be eminently satisfactory in operative effectiveness, for reasons herein set forth.

Third, the cushioning springs 10 that provide a resilient mounting in bracket 3 for the auxiliary axle springs 4 come into play when "running light" and vehicle must "ride easy".

Among the advantages accruing from the use of my attachment, better road protection is of extreme importance, increased carrying capacity of all kinds of roads also being insured by the more evenly distributed road loads, concentration of load pressures on limited sub-soil areas being avoided; heavier loads may be carried without change in tire sizes; improved riding qualities due to more effective dampening and wider distribution of road shocks provide against damage to goods easily broken, furnishing to passenger-carrying vehicles an especially appreciated comfort feature; wear of tires and of roads is decreased; danger from blowouts minimized by decreased tire stress for given load; greater safety due to improved "road holding" capacity and correspondingly lessened tendency to skid; increased vehicle life, tire mileage, and economy of maintenance and operation, notwithstanding that loads carried are heavier and income correspondingly greater.

Skilled mechanics and special tools are not required in order to insure satisfactory installation of my unitary third axle attachment, which becomes an integral part of the vehicle when applied.

While my invention is not limited by the character of the vehicle to which it is applied nor to any particular type of spring suspension, its application to one type of motor vehicle chassis, in the manner specified and as disclosed by the accompanying drawings, is described and illustrated with sufficient clarity to enable persons skilled in the art to which the invention appertains not only to make and apply it as shown but to embody it in various modifications thereof without enlarging the domain of its scope and without departing from its spirit as herein revealed. I therefore do not wish to be limited to the precise details of construction herein described and shown but desire to avail myself of such variations and modifications thereof as come within the scope of the appended claims.

What I claim is:

1. The combination with a standardized four-wheel motor-vehicle running gear, including chassis frame and attached springs mounted on a front axle equipped with dirigible wheels and on a rear "live" axle equipped with driving wheels, of an auxiliary unitary running-gear structure comprising a chassis-frame extension for attachment to frame of said standardized four-wheel motor vehicle running gear, a wheel-equipped trailing dead-axle, with springs flexibly attached thereto and supported in oscillatory relation to and by said frame extension through brackets thereto attached and to said springs, and load-distributing oscillable floating links pivotally attached to the rearward eye ends of springs mounted on said rear live axle, the rearward ends of said live-axle springs lying in the same vertical plane with and overlapping the forward ends of said trailing dead-axle springs, said floating links being interposed between and shackled to the overlapping ends of springs of both live and dead axles, said links yieldably so associating said springs that the additional load for which the trailing auxiliary running gear unit provides partial support is so proportionately distributed to driving and trailing axles as to avoid necessity for adding extra leaves to increase the load-carrying capacity of the originally provided driving-axle springs and thereby prevent breakage thereof.

2. The combination with a standardized two-axle four-wheel motor-vehicle running gear of a secondary trailing third-axle running-gear unit adapted for attachment to an extension of the chassis frame of said two-axle vehicle and to drive-axle springs supported in oscillatory relation to said chassis-frame, said secondary running-gear unit comprising a wheel-equipped non-driving, or dead, axle, with long leaf springs yieldably connected thereto at their rearward ends through one stationary and one oscillable axle bracket, said springs at center thereof being connected to said frame extension by suitable brackets embracing auxiliary spring means whereby light road shocks are absorbed, and at forward ends thereof to pivotally secured links whereby said secondary-unit springs are brought into cooperative co-acting association with floating linkage interposed between and connecting both auxiliary axle springs and drive-axle springs, said floating linkage serving to definitely proportion the weight distributed to and supported by said axles in such a way as to obviate breakage of originally-provided four-wheel vehicle drive-axle springs, said floating linkage embracing means for insuring uncramped flexure of said drive-axle springs and stop-lug means for modifying load distribution.

3. The combination with a standardized four-wheel motor vehicle running-gear frame and frame extension, of resilient means comprising long-leaf springs for supporting, in oscillatory relation to said frame and extension thereof, primary driving and secondary trailing axles connected to said springs, the rearward ends of primary-axle springs lying in the same plane with and over-lapping the forward ends of secondary trailing-axle springs, the latter being attached to trailing-axle at their rearward ends by two brackets, of which one is fixedly positioned on said axle while the other, to relieve torsional stresses set up when making turns, is free to oscillate thereon, and bifurcated spring-straddling floating links of three-point-suspension walking-beam type pivotally connected therebetween at forward ends to said driving axle, at rearward ends to drive-axle springs, and at a point below and intermediate the link ends to trailing-axle forward end spring shackles, said floating links constituting means for associating said springs with said frame, with said axles, and with each other in a manner whereby driving-wheel traction is increased to a degree greater than would be the case if springs were connected by shackles alone and whereby distribution of weight between said axles is so definitely proportioned as to prevent breakage of originally-provided drive-axle springs.

4. The combination with a standard two-axle four-wheel motor-vehicle frame and a pair of drive-axle springs having forward ends pivotally connected to said frame and a drive axle mounted intermediate the ends of said springs, of an auxiliary trailing non-driving third axle carrying leaf springs yieldably and pivotally associated with an extension of said frame at points intermediate their ends, the rearward ends of said auxiliary axle springs being attached to trailing third axle by two brackets, one fixedly positioned on said axle, the other being free to oscillate thereon, and floating links pivotally connected at forward ends to four-wheel vehicle drive axle, at rearward ends to drive-axle springs, and at points below and intermediate said link ends to shackles connecting them with the forward ends of trailing-axle springs, which lie in the same vertical plane as and are overlapped by rear ends of drive-axle springs, said floating links constituting means for associating the overlapping ends of said springs whereby weight is proportionately distributed between said axles to increase driving wheel traction and prevent breakage of originally-provided drive-axle springs and whereby each of said axles may move without cramping the movement of the other.

5. The combination with a standardized two-axle four-wheel motor vehicle running gear, including chassis frame and front and rear springs, the latter having their forward ends pivotally connected to said frame and centrally mounted in conventional manner on the drive-axle, of an auxiliary running-gear unitary structure having long leaf springs associated with an extension of said chassis frame by shock-relieving attaching brackets, an auxiliary trailing third axle connected to the rearward end of one leaf of each of said auxiliary-axle springs through supporting brackets of which one is fixedly positioned on trailing-axle, the other being free to oscillate thereon, radius rods formed as leaves of said auxiliary springs, the forward ends of which are overlapped by rearward ends of drive-axle springs aligned therewith, and oscillable three-point suspension floating-link members pivotally attached at forward ends to drive axle and connecting the overlapping ends of said auxiliary-axle springs with the drive-axle springs in a manner definitely to proportion the distribution of weight between the two axles so as to increase driving-wheel traction and prevent breakage of the drive-axle springs to which the third-axle unit springs are yieldably attached by said link members, which are provided with a stop-lug means for changing weight distribution to further protect said springs against breakage when vehicle is heavily loaded.

6. The combination with a two-axle four-wheel motor vehicle running gear and chassis frame with drive-axle springs having the forward ends thereof pivotally connected to said frame and with driving axle mounted intermediate the ends of said drive-axle springs, of an auxiliary trailing third axle connected to leaves of auxiliary-axle springs by two attaching brackets, one of which is fixedly positioned on said third axle, the other being free to oscillate thereon, radius rods formed as leaves of said auxiliary axle springs, and oscillable weight-distributing floating-link members connected to and interposed between the ends of drive-axle springs and of said auxiliary-axle springs which lie in the same vertical plane and overlap each other at ends thereof, said floating-link members serving to so distribute the load as to avoid breakage of original four-wheel vehicle drive-axle springs and increase driving wheel traction, the rearward ends of said auxiliary axle springs being so connected to trailing-axle brackets as to permit a degree of independent movement sufficient to bring third-axle wheels into proper turning alignment with drive-axle wheels and compensate for torsional stresses set up when making turns.

7. The combination with a standardized two-axle four-wheel self-propelled vehicle having a chassis frame with conventionally applied front and rear axles, and long leaf semi-elliptic drive-axle springs having the forward ends thereof pivotally connected to said frame, of an auxiliary trailing running-gear unit comprising an attachable supporting frame-member extension for lengthening said standard-vehicle chassis frame, a non-driving, or dead, trailing third axle, and springs yieldably associated with said frame extension and with drive-axle springs, by shock-absorbing supporting brackets attached to said frame extension and by weight-distributing floating links pivotally attached at forward ends to drive axle, at rearward ends to drive-axle springs and intermediately at lowermost suspension points of said links to the forward ends of dead-axle springs, to which latter the floating links are connected by pivotally attached shackles, said auxiliary trailing-axle springs having slotted spring-end means for connecting them to one fixedly-positioned and one oscillable bracket whereby said auxiliary axle may have stress-relieving movement relative to said frame extension.

8. The combination with a four-wheel motor vehicle of standardized design, having chassis frame, front axle, drive axle, and long leaf semi-elliptic springs pivotally attached at forward ends thereof to said frame and oscillably attached to said drive axle at points intermediate the ends of said springs, of a non-driving, or dead, trailing axle and springs yieldably attached at rearward ends to one fixedly positioned and one oscillable bracket on said axle, flexibly attached by shock-absorbing brackets to the extension of said standard vehicle frame at points intermediate their ends, and at forward ends yieldably connected to the rearward ends of the drive-axle springs by floating links and shackle fittings so as to transfer part of the weight stress on said auxiliary springs directly to said drive axle to increase driving-wheel traction without overloading the originally-provided standard drive-axle springs and compensate for spring-length changes under variations of stress thereon, one of the leaves of each trailing-axle spring having an elongated eye to provide sufficient freedom of swiveling action to offset torsional stresses when making turns, another leaf immediately above acting as a radius rod to preserve auxiliary axle alignment and tracking of wheels.

9. In an auxiliary or supplemental motor-vehicle running-gear unit adapted for attachment to four-wheeled self-propelled vehicles to secure increased load-carrying capacity, the combination of a non-driving or "dead" axle supported by road wheels trailing or tracking behind those of the four-wheel vehicle drive axle and yieldably attached by long leaf springs held to an extension of the chassis frame by suitable brackets, the rearward ends of said springs being yieldably attached to said "dead" axle by a pair of fittings, one fixedly positioned while the other is oscillable, the forward ends of said springs and rearward ends of the drive-axle springs being brought into yieldable cooperative association through floating load-distributing links having stop lug means for effecting a sufficient change in load-stress distribution to prevent breakage of the drive-axle springs, the stop lugs provided near the forward ends of the floating links coming in contact with the upper leaves of the primary or drive-axle springs as a result of excessive overloading.

10. In auxiliary trailing running gear for attachment to four-wheel motor vehicles to increase their load-carrying capacity, the combination of a wheel-equipped dead axle, springs yieldably attached thereto by brackets permitting restricted independent movement of said axle in relation to the drive axle, whereby torsional stresses and tire "scuffing" are reduced when making turns, brackets for yieldably attaching said springs to chassis frame extension, pivotally mounted weight or load-distributing links yieldably connected to adjacent ends of the drive-axle and trailing auxiliary-axle springs, the forward ends of said links being pivotally connected to said drive axle and serving to transfer to its driving wheels enough of the additional load, for which the supplementary running gear unit provides, to obviate need for increasing the load-carrying capacity of the original drive-axle springs of the four-wheel vehicle to which the supplementary running gear unit is applied, said links having means providing accommodation for spring-length changes due to flexure under varying loads and road shocks, also stop-lug means for changing load-stress distribution and thereby prevent breakage of overload drive-axle springs, the rearward ends of said auxiliary dead-axle springs having elongated eyes permitting slight independent movement of said auxiliary axle in relation to said drive-axle, thereby relieving torsional stresses and "scuffing" of tires when making turns.

11. An auxiliary or supplemental unitary running-gear structure for cooperative association with the chassis frame and load-supporting drive-axle springs of standard four-wheel motor vehicles to increase their load-carrying capacity without increasing the strength or otherwise altering the construction or positional relationships of primary or original springs and comprising in combination a wheel-equipped trailing dead axle, load-carrying springs yieldably attached to said trailing dead axle by a stationary and a movable fitting, each of said springs having an attaching leaf provided with an elongated eye that permits of sufficient relative movement between the drive and trailing axles to allow one trailing wheel to travel slightly ahead of the other, thereby reducing tire wear due to "scuffing" when making turns, said auxiliary-unit dead-axle springs being yieldably connected to the drive-axle springs by means of shackles and floating load-distributing links interposed between the overhanging rearward ends of the drive-axle springs and underlapping forward ends of the auxiliary dead-axle springs, said floating links having means for compensating for spring-length changes due to flexure of springs and stop-lug means for changing load-stress distribution, whereby breakage of excessively overloaded drive axle springs is prevented.

12. An auxiliary or supplementary load-sustaining motor-vehicle running-gear attachment comprising a non-driving or "dead" axle, a pair of supporting road wheels thereon, a pair of springs yieldably attached thereto as well as to the chassis frame by suitable fittings and brackets, said springs being connected to the motor-vehicle drive-axle springs by a pair of pivotally-mounted floating links that transfer to the drive axle a predetermined part of the added load stress for which the auxiliary running-gear unit provides, thereby increasing the road traction of the driving wheels, the greater part of the additional load stress being transferred by the floating links to the trailing dead axle and its supporting load wheels, said floating links having overload stops that by contacting with the upper leaves of the drive-axle springs prevent breakage thereof when overloaded, the rearward ends of the auxiliary springs having elongated eyes that permit of slight auxiliary-axle movement responsive to the twisting or torsional stress set up when turning, this compensatory movement serving to reduce "scuffing" of tires and wear due thereto.

13. An auxiliary or supplementary running-gear attachment unit for increasing the load-carrying capacity of four-wheel motor vehicles by converting them into six-wheel vehicles, providing a rear-end group of four wheels through one pair of which the vehicle is propelled, the other pair trailing behind the driving wheels, and serving, through axle and springs attached thereto and to the chassis frame, to support the major portion of the extra load that their use permits of carrying, said attachment unit comprising a non-driving or "dead" axle, road wheels for supporting said axle, long leaf-type springs attached thereto by a pair of brackets, one of which is fixedly attached to the axle, while the other is oscillable, said springs being yieldably and pivotally attached by suitable brackets to a chassis frame extension and to the rearward ends of the four-wheel vehicle rear springs by weight-distributing floating links shackled to the forward ends of said auxiliary springs, the primary or original springs of the four-wheel vehicle and supplementary springs of the attachment unit being thereby cooperatively associated to distribute load and road-shock stresses in such manner as to prevent excessive overloading and consequent breakage of the originally-applied or primary drive-axle springs, said floating links embodying means whereby compensation for spring-length changes due to flexure is secured automatically, said auxiliary unit or dead-axle springs having elongated eyes at rearward ends thereof for reducing the torsional stresses set up when making turns, one auxiliary axle wheel then trailing slightly ahead of the other.

14. A motor-vehicle running-gear attachment for increasing the load-carrying capacity of two-axle four-wheel self-propelled vehicles by converting them into three-axle six-wheel vehicles without raising center of gravity, and comprising an auxiliary, or secondary, non-driving, or "dead" axle, trailing road wheels conventionally mounted thereon, a pair of long leaf springs attached thereto by a fixedly-positioned fitting and an oscillable fitting mounted on said dead-axle housing, said springs, at points intermediate the ends thereof, being pivotally and yieldably attached to an extension of the chassis frame by a pair of suitable brackets, said frame brackets embracing means whereby light-load road shocks are absorbed, said springs lying in the same vertical plane as those of the originally-provided, or primary, drive-axle springs of the four-wheel vehicle, the rearward ends of said drive-axle primary springs overlapping the forward ends of the auxiliary-axle or secondary springs, said primary, or drive-axle, springs being co-operatively associated with the secondary, or dead-axle, springs by floating weight-distributing connecting links having means compensating for spring-length changes due to flexure of drive-axle springs and stop-lug means for changing load-stress distribution to prevent breakage of drive-axle springs when excessively overloaded, said floating links, connecting shackles, associated primary and secondary springs, and auxiliary-axle fittings forming a highly resilient structure for absorbing road shocks and so distributing load stresses to primary and secondary axles and wheels in predetermined proportions that the primary, or original, drive-axle springs may be retained without adding extra leaves to increase their load-carrying capacity, said auxiliary, supplementary, or third, axle and wheels supporting the major part of the extra load that the auxiliary running-gear unit permits of carrying without loss of resiliency of original drive-axle springs, said auxiliary-axle springs having leaves that serve as adjustable radius rods, and at rearward ends thereof eyes having the form of elongated slots wherein the pins for shackling the springs to the auxiliary axle fittings are free to move independently and thereby automatically provide relief for torsional stresses normally set up when making turns.

15. A supplementary running gear unit, for increasing the load-carrying capacity of tractor-trailer combination vehicles and adapted for attachment either to single-axle two-wheel semi-trailers or two-axle four-wheel trailers and comprising in combination a wheel-equipped non-driving, or dead, auxiliary axle, long-leaf semi-elliptic springs yieldably attached at their rearward ends to fittings on said axle, pivotally attached at mid section to supporting brackets on the frame of the trailing vehicle, and connected at underlapping forward ends to overlapping rearward ends of rear springs of trailing vehicle by means of interposed floating linkage adapted to distribute the load between regular and supplementary axles in predetermined proportions such as to obviate any necessity for increasing the strength of the originally-provided, or regular, trailing-vehicle springs, said floating linkage embracing means compensating for spring-length changes due to flexure, the supplementary or auxiliary-axle springs having leaves that serve as radius rods for normally holding supplementary axle parallel to trailing vehicle axle, said auxiliary-axle springs having at rearward ends elongated slots wherein spring shackle bolts have restricted free movement that automatically provides relief for torsional stresses set up in supplementary unit when making turns.

In testimony whereof I affix my signature.

GILBERT E. PORTER.